Oct. 6, 1925.
A. G. RIPBERGER
1,555,877
ELECTROMAGNETIC CHUCK
Filed June 5, 1922
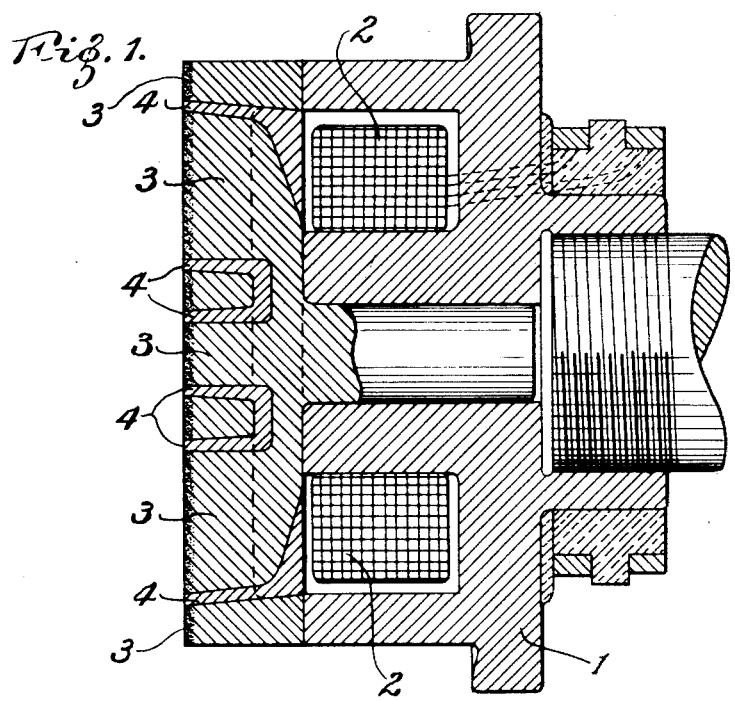
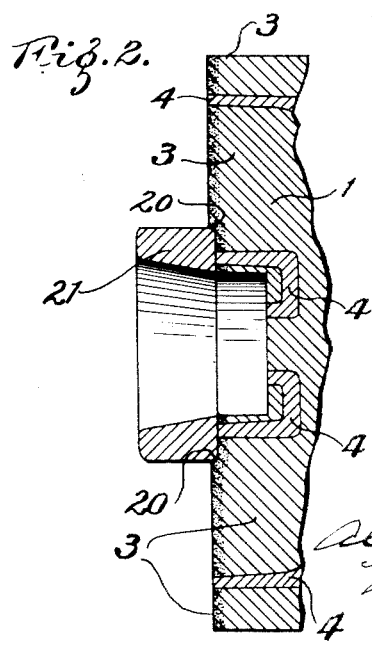
Inventor:
Alexander G. Ripberger,
by Connet Camie,
His Attorneys.

Patented Oct. 6, 1925.

1,555,877

UNITED STATES PATENT OFFICE.

ALEXANDER G. RIPBERGER, OF CANTON, OHIO, ASSIGNOR TO THE TIMKEN ROLLER BEARING COMPANY, OF CANTON, OHIO, A CORPORATION OF OHIO.

ELECTROMAGNETIC CHUCK.

Application filed June 5, 1922. Serial No. 566,115.

*To all whom it may concern:*

Be it known that I, ALEXANDER G. RIPBERGER, a citizen of the United States, and a resident of the city of Canton, county of Stark, and State of Ohio, have invented a new and useful Improvement in Electromagnetic Chucks, of which the following is a specification.

My invention relates to electro-magnetic chucks and has for its principal objects to provide such chucks with face plates whose work engaging surface will not be easily marred or worn down by the work mounted thereon.

The invention consists principally in making the surface portion of the face plate of hardened steel.

In the drawing which forms part of this specification and wherein like reference characters indicate like parts wherever they occur—

Fig. 1 is a sectional view of a magnetic chuck embodying my invention; and

Fig. 2 is a sectional view of a modified form thereof.

The present invention is applicable to magnetic chucks of any type. In the drawing, the invention is shown embodied in a chuck of the rotary type comprising a body 1 in which is mounted the usual electric induction coil or coils 2. Mounted on the body are pole pieces 3 that are adapted to be energized by the electric current passing through the coil. Said pole pieces 3 are arranged so that the north and south poles alternate, as will be readily understood. The spaces between the pole pieces are filled with lead 4 or some other non-conducting material. The ends of the pole pieces and the spacers are formed into a smooth surface on which the work is mounted. The pole pieces 3 and the spacers 4 are commonly designated as the face plate of the chuck.

The pole pieces are made of soft iron or steel and are likely to be roughened or rapidly worn down by contact with the work. In order to prevent this, I case-harden the ends of the pole pieces, as indicated in the drawing by the stippling, thus providing hard metal for the work to abut against.

In Fig. 2 is shown a modified form of the invention, in which the face plate is provided with a shallow recess 20 adapted to fit the work 21 that is to be secured to the chuck. This prevents slipping of the work and permits it to be easily centered. The chuck is also provided with a central bore to accommodate a grinding wheel or other tool.

The chuck above described has numerous advantages. The face plate is durable and not lightly to be roughened or grooved by engagement with steel or other hard objects. The work engaging surface is thus kept true, which is an important advantage. The recess of the face plate shown in Fig. 2, provides simple means for centering the work and prevents slipping of the work across the face of the chuck.

What I claim is:

An electro-magnetic chuck having a face plate whose work engaging surface is case-hardened.

Signed at Canton, Ohio, this 31st day of May, 1922.

ALEXANDER G. RIPBERGER.